July 25, 1933.  R. K. BEHR  1,919,192
FLUID HEATER
Filed April 19, 1928   3 Sheets-Sheet 3
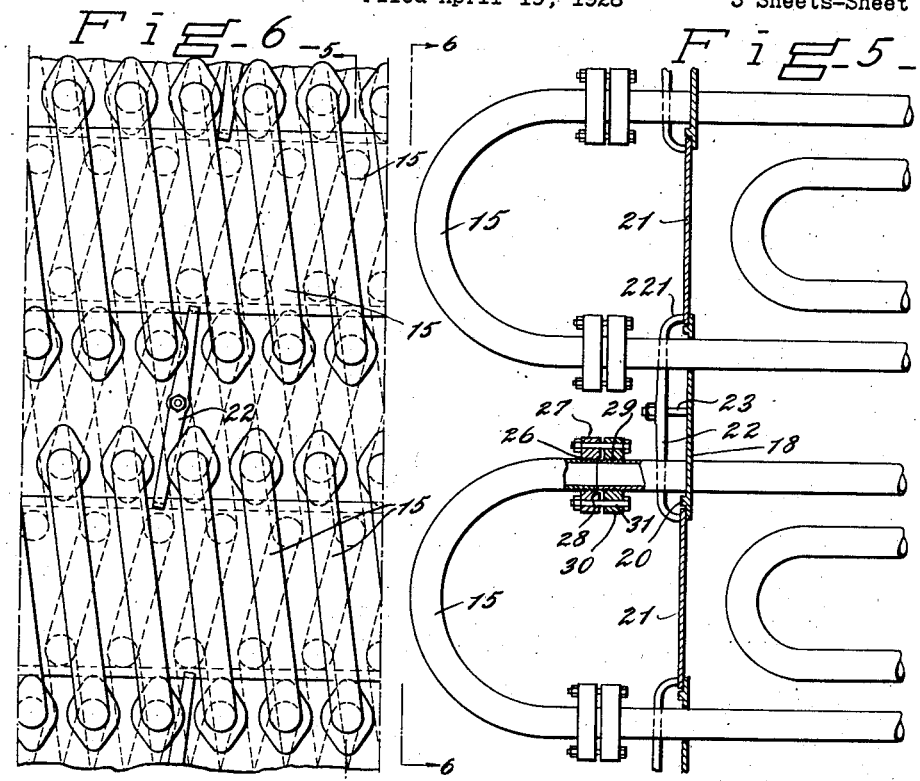
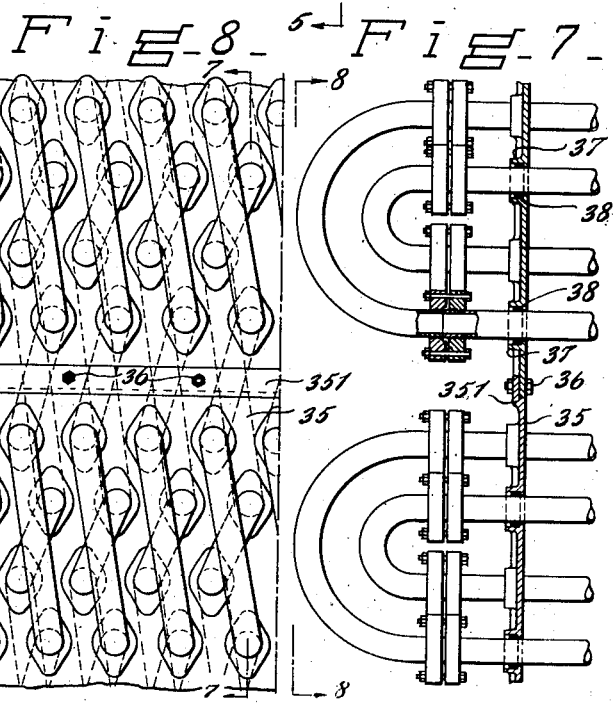
INVENTOR
Robert K. Behr
BY
Gifford & Scull
ATTORNEYS

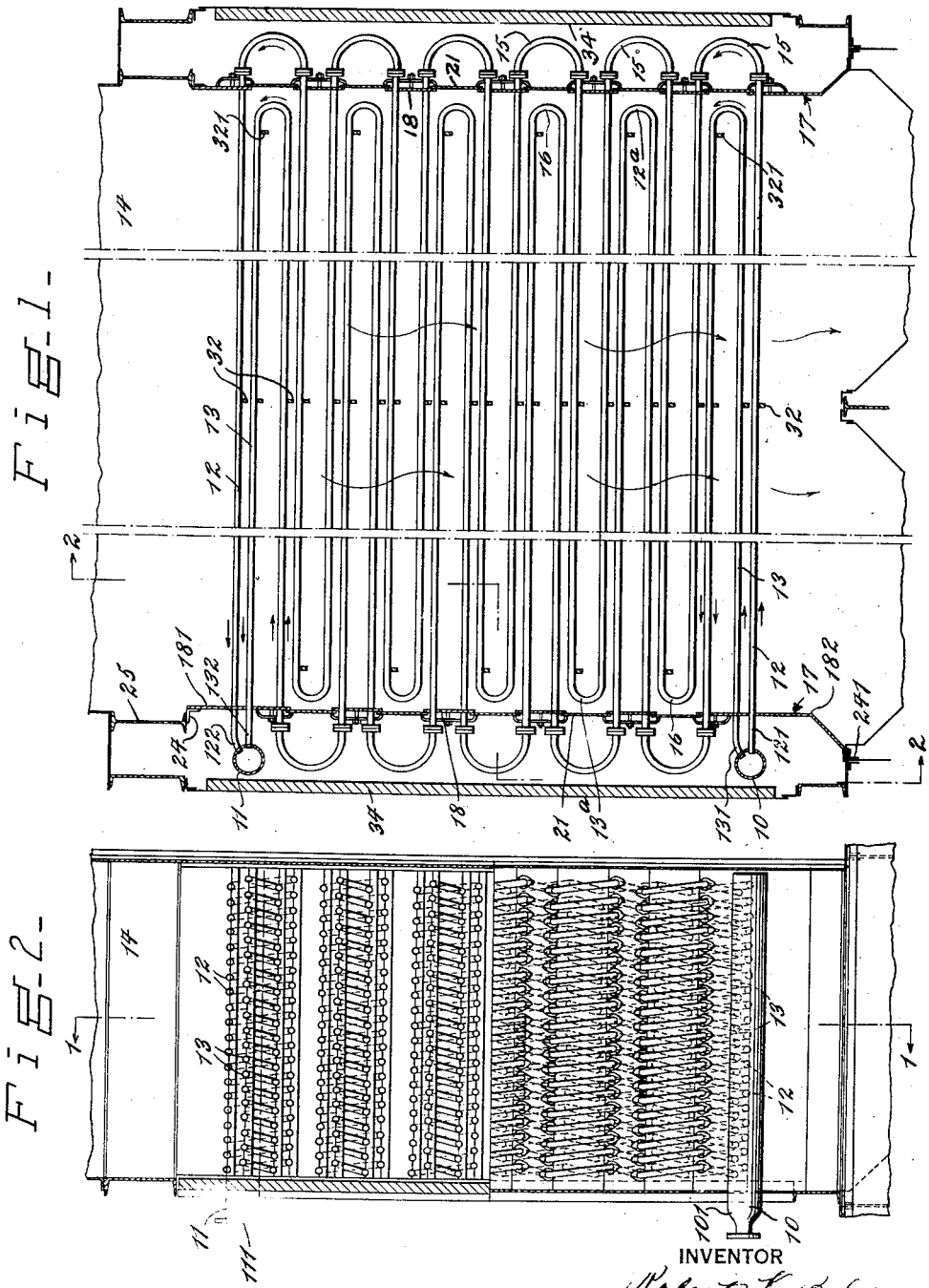

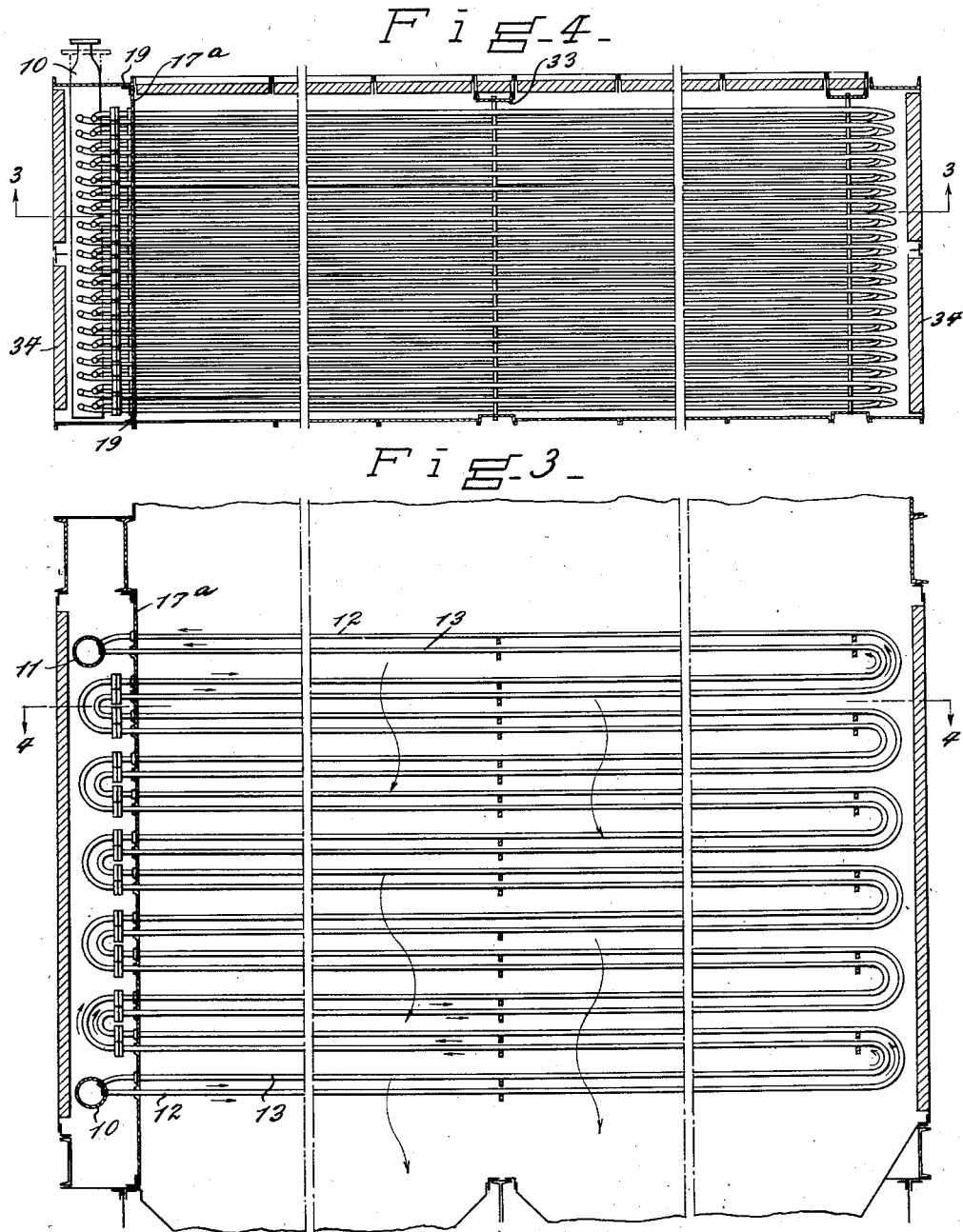

Patented July 25, 1933

1,919,192

UNITED STATES PATENT OFFICE

ROBERT K. BEHR, OF NEW YORK, N. Y., ASSIGNOR TO THE BABCOCK & WILCOX COMPANY, OF BAYONNE, NEW JERSEY, A CORPORATION OF NEW JERSEY

FLUID HEATER

Application filed April 19, 1928. Serial No. 271,183.

While my invention is particularly applicable to economizers, it will be understood that it is also applicable to fluid heaters other than economizers.

My invention will best be understood by reference to the accompanying drawings, in which I have illustrated two embodiments thereof and in which Fig. 1 is a vertical section through an economizer embodying my invention, taken on the line 1—1 of Fig. 2; Fig. 2 is a vertical section taken on the line 2—2 of Fig. 1; Fig. 3 is a vertical section similar to Fig. 1, illustrating a modified form of my invention; Fig. 4 is a sectional plan view taken on the line 4—4 of Fig. 3; Fig. 5 is a fragmentary sectional elevation of a portion of the economizer shown in Figs. 1 and 2, and taken along the line 5—5 of Fig. 6; Fig. 6 is an end elevation taken along the line 6—6 of Fig. 5; Fig. 7 is a view similar to Fig. 5 taken along the line 7—7 of Fig. 8, and illustrating a portion of the economizer shown in Figs. 3 and 4, and Fig. 8 is an end elevation of Fig. 7 taken on the line 8—8.

Like reference characters indicate like parts throughout the drawings.

Referring now to the drawings, and first to the form of my invention illustrated in Figs. 1, 2, 5, and 6, 10 is an inlet, and 11 an outlet header of a fluid heater, here shown as an economizer. The headers are connected by a plurality of tubular members, which are here shown as arranged in rows, each row comprising two lines of tubular members 12 and 13, bent back and forth in a plurality of passes across a flue 14 in which they are located, with return bends at the ends of the tubes. Each tubular member may be considered as a zig-zag coil formed of straight tubes connected by return bends or loops. The tubular members 12 are shown as entering the inlet header 10 radially as at 121, and the lowermost legs of the said members are arranged in, or substantially in, a plane passing through the center of the header 10. The lowermost legs of the tubular members 13 also enter the header 10 radially, but are bent at their ends as at 131. The uppermost legs of the tubular members 12 are preferably bent as at 122 where they enter the header 11, while the tubular members 13 are straight and enter the header 11 as at 132.

The tubular members 12 and 13 are provided with alternately large and small bends at opposite ends of the heater, as will be evident from an inspection of Fig. 1. Each tubular member is also provided with alternate removable return bends 15 and integral return bends 16 at opposite ends. In the form shown in Figs. 1 and 2, the removable bends for the row of tubular members 12 are located at the right-hand end of the heater, and the integral bends at the left-hand end thereof, while the removable bends 15 for the tubular members 13 are located at the left-hand end of the heater, and the integral bends 16 therefor at the right-hand end of the heater, as will be evident from an inspection of Fig. 1. The removable return bends 15 are located at both ends of the heater in the embodiment shown in Figs. 1 and 2.

A casing wall indicated generally at 17 crosses the tubular members 12 and 13, and is located inside of the removable return bends 15 and the joints formed between these return bends and the straight portions of the tubular members, but is located outside of the integral return bends, so that the integral return bends are within the flue. Each of the casing walls 17, in the form shown in Figs. 1 and 2, comprises stationary cross plates 18 (see Fig. 5) extending across the fluid heater and provided with openings for the reception of the tubes, and connected at their ends to angle irons 19 at the sides of the heater in the same manner as shown for the single casing wall 17ᵃ in Fig. 4.

The stationary plates 18 are provided with openings through which the straight portions of the tubular members 12 and 13 pass. The plates 18 are preferably provided near their edges with ribs or lugs 20. Removable plates 21, which are preferably imperforate also extend across the fluid heater and are located inside of the tubes having the larger bends, are received outside of the ribs 20 of two adjacent stationary plates 18, and are seated against these plates. Dogs 22 are curved at their outer ends as at 221, the curved ends engaging the removable plates 21. Bolts 23, which may be fastened to the stationary plates 18, are provided at their outer ends with nuts which serve to clamp the ends 221 of the dogs against the stationary plates and retain them in position against the same. The stationary and removable plates thus form continuous casing walls 17 defining the two ends of the flue as shown in Fig. 1. The uppermost stationary plate 181 may be suitably secured to an angle iron 24 which is, in turn, secured to an I-beam 25. Similarly, the lowermost stationary plate 182 is supported by an angle iron 241.

In the embodiment illustrated, the lowermost plate 182 is bent outwardly at its lower edge, but it will be understood that it could be made flat in the same manner as the uppermost plate 181.

The ends of the return bends 15 are preferably threaded as at 26, and a threaded flange 27 is received thereon and may be spot-welded thereto if desired, since in practice it is unnecessary to remove the flanges 27 from the removable return bends. The flanges 27 are preferably countersunk as at 28, to receive the ends of the straight portions of the tubes 12 and 13. The ends of the straight tubes extending across the flue are also threaded as at 29, threaded flanges 30 being received on the straight ends of the tubes. The flanges 27 and 30 are preferably clamped together as by bolts 31 passing through the flanges.

Cross-bar supports 32 preferably extend beneath the middle portion of each horizontal row of tubes, the ends of the cross bars being received in openings in vertically extending channel members 33 at the sides of the flue as best shown in Fig. 4. Other cross bars 321 preferably extend beneath the U-tubes having the smaller bends, and adjacent the integral return bend as best shown in Fig. 1. The cross bars 32 and 321 are preferably fluted on their upper edges for the purpose of retaining the tubes in their correct positions transversely of the fluid heater. Fluted bars of this character are illustrated and described in an application of James E. Trainer and Ivar Langvand, Serial No. 245,970, which was filed in the Patent Office on or about January 11, 1928, and as the specific arrangement of the bars constitutes no part of my present invention, the details thereof have not been illustrated herein.

Removable outer casing panels 34 are preferably located outside of the removable return bends as best shown in Fig. 1. It will be evident from Fig. 2 that the plane for each U-tube is arranged at an angle to the vertical, and that the planes of an associated small bend tube and large bend tube extend at an angle to each other, and the tubular members are so bent that the straight portions of the tubular members 12 are staggered with respect to the similar portions of the tubular members 13.

To remove a small bend tube, for example, the tube 13ª in Fig. 1, the panel plates 34 are first removed from both ends of the heater and the return bends 15 which are connected to the ends of this tube are then removed. The removable plate 21 at the opposite end is taken out, and the U-tube 13ª is then free to be withdrawn through the space previously occupied by the removable plate 21. It will be evident that the next lower U-tube 12ª could be removed in the same way from the opposite end of the fluid heater. Water enters the lowermost header 10 as at 101, and flows in a generally upward direction through the tubular members 12 and 13 to the outlet header 11, the outlet of which is indicated at 111, the hot gases flowing downwardly over the tubes in a direction indicated by the arrows, and counter to the flow of the water in the tubes.

In the arrangement illustrated in Figs. 3, 4, 7, and 8, the removable return bends are all located at the same end of the fluid heater, at the left end as viewed in Figs. 3 and 4. In this arrangement, there is but one inner casing wall indicated at 17ª located inside of the removable return bends and the joints between these return bends and the straight portions of the tubes. The casing is made up of a plurality of stationary plates 35 extending across the fluid heater, the edges of the plates overlapping as at 351, the overlapping portions preferably being bolted together as at 36. The plates 35 may be provided with bosses 37 surrounding the tubes, suitable packing rings 38 forming gaskets around the tubes preferably being located inside of the bosses 37 and surrounding the tubes.

In the arrangement illustrated in Figs. 3, 4, 7, and 8, all of the tubes would be removed from the right-hand end of the fluid heater, the parts being assembled and disassembled in the manner which will readily be understood from the description in connection with Figs. 1, 2, 5, and 6. It will be understood that it is an advantage to be able to remove all of the tubes from the same end of the heater.

It will be evident that only one-half as many removable return bends are needed for a given number of economizer tubes as would be the case if removable return bends were provided at each end of each U-tube. At the same time, the parts may be readily assembled and disassembled as will be evident from the foregoing description. The arrangement is particularly adaptable to economizers in which the tubes are not made of the maximum length that is sometimes called for.

By forming the tubes with joints at one end only and making them integral at the other end as illustrated, only half as many joints are necessary as would be the case if joints were provided at both ends of the curved tubes. At the same time, the tubes are cleanable, since the end of the straight portion of each tube may be exposed by the removal of the joint which is connected thereto.

By connecting a plurality of rows of tubes to the two headers, and causing the fluid to pass through the tubes in parallel, and by placing the joints at one end only of the bent tubes, head room for the fluid heater is decreased. In other words, for a given number of rows of tubes, and having a given heating surface, the height of the economizer is not as great as would be the case if joints were provided at both ends of all of the bends.

I claim:

1. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, each of said rows being arranged in a plane extending transversely of the headers.

2. In combination, a flue adapted to carry heated gases, a fluid heater comprising an inlet and an outlet header, a plurality of rows of tubular members connected at their ends to the respective headers whereby the fluid flows therethrough in parallel, each row extending across the flue in a plurality of passes and the portions of the tubular members of each row which extend across the flue being connected at one end of the heater by integral bends and at the other end of the heater by removable bends, adjacent tubes through which the fluid flows in the same direction being more closely spaced than are the adjoining tubes through which the fluid flows in opposite direction, each of said rows being arranged in a plane extending transversely of the headers.

3. In combination, a fluid heater comprising substantially horizontally disposed inlet and outlet headers, a plurality of rows of tubular members connected at their ends to the respective headers whereby the fluid flows therethrough in parallel, each row extending across the flue in a plurality of substantially horizontally extending passes, the portions of the tubular members of each row which extend across the flue being connected at one end of the heater by integral bends and at the other end of the heater by removable bends.

4. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, the parts being constructed and arranged to permit removal of all of the tubes from the same side of the heater.

5. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, each row of tubular members forming a series of U-tubes with bends which are alternately of relatively large and relatively small radii, each of said rows being arranged in a plane extending transversely of the headers.

6. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, each row of tubular members forming a series of U-tubes with bends which are alternately of relatively large and relatively small radii, the successive U-tubes of a given row being connected by integral bends and removable bends which alternate with each other.

7. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, each row of tubular members forming a series of U-tubes with bends which are alternately of relatively large and relatively small radii, a U-tube with an integral bend occupying a position within a U-tube with a removable bend, each of said rows being arranged in a plane extending transversely of the headers.

8. In combination, a flue adapted to carry heated gases, a fluid heater comprising an inlet and an outlet header, a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, walls extending across an end of said heater comprising stationary plates extending transversely of the tubes and provided with openings through which the tubes of the heater pass, and removable plates adapted to be secured against said stationary plates, said tubes being adapted to be removed through the spaces normally occupied by said removable plates, each of said rows being arranged in a plane extending transversely of the headers.

9. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, a portion of the integral bends and of the removable bends being located at one end of the heater and another portion thereof being located at the opposite end of the heater.

10. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable bends, all of the integral bends being located at one end of the heater and all of the removable bends being located at the opposite end of the heater.

11. In fluid heat exchange apparatus, a casing through which hot gases are passing, a plurality of pairs of tubular constructions each having successive portions extending back and forth across the casing so as to convey in enclosed streams a fluid to receive heat from the gases, said successive portions forming alternately large and small U-tubes with the loops of the larger U-tubes arranged externally of the casing, and the loops of the smaller U-tubes arranged internally of the casing, the small U-tubes of one construction being each embraced by an adjacent large U-tube of the other construction, means for delivering a fluid to corresponding ends of said constructions for flow through them in a general direction opposite to the flow of gases through the casing, and means for receiving the fluid discharging from the other ends of the constructions.

12. In fluid heat exchange apparatus, a casing through which hot gases are passing, a plurality of pairs of tubular constructions each having successive portions extending back and forth across the casing so as to convey in enclosed streams a fluid to receive heat from the gases, said successive portions forming alternately large and small U-tubes with the loops of the larger U-tubes of one construction embracing the loops of the smaller U-tubes of an adjacent construction, means for delivering a fluid to corresponding ends of said constructions for flow through them in a general direction opposite to the flow of gases through the casing, and means for receiving the fluid discharging from the other ends of the construction, some of the loops of the smaller U-tubes being located within the casing.

13. An economizer, comprising, in combination, a flue or casing through which hot gases are passing, means at opposite sides of the flue providing supplementary casings from which the gases are excluded, a fluid inlet header positioned in a supplementary casing, a fluid outlet header positioned in a supplementary casing, a plurality of rows of inlet tubes leading across the flue from the inlet header, a plurality of fluid outlet tubes extending transversely of the flue and discharging into the outlet header, rows of intermediate tubes through which enclosed streams of fluid pass transversely of the flue from the inlet tubes to the outlet tubes, small integral return bends positioned within the flue so as to connect adjacent intermediate tubes and some of the inlet and outlet tubes with adjacent intermediate tubes, removable return bends disposed in the supplementary casings so as to connect pairs of intermediate tubes embracing the small return bends and to connect certain of the intermediate tubes with some of the inlet tubes and some of the outlet tubes, and removable cover plates in the walls of the flue to permit the removal and replacement of the U-tubes formed by the integral return bends, said tubes and return bends being so arranged that parallel streams flow from the inlet header back and forth across the flue in the same direction to the outlet header.

14. An economizer comprising, in combination, a flue through which hot gases are passing, a supplementary casing at one side of the flue, a fluid inlet header positioned in the supplementary casing, a fluid outlet header positioned in the supplementary casing, a plurality of rows of fluid inlet tubes extending from the inlet header transversely of the casing, a plurality of rows of fluid outlet tubes extending transversely of the casing to the outlet header, intermediate tubes positioned between the inlet and outlet tubes and extending transversely of the flue and into the supplementary casing, small integral return bends positioned within the flue so as to connect the tubes of one of the inlet and outlet rows with intermediate tubes and to connect adjoining intermediate tubes, large integral return bends positioned within the casing, and extending around the small integral return bends to connect the others of the tubes, small removable return bends positioned within the supplementary casing and connecting the ends of adjoining intermediate tubes, large removable return bends extending around the small removable return bends to connect others of the intermediate tubes, and means within the flue for supporting the tubes, said tubes and return bends being arranged so as to provide for the parallel flow of liquid from the inlet header back and forth across the flue to the outlet header.

15. An economizer comprising, in combination, a casing having inlet and outlet for a heating medium, a plurality of rows of U-bent tubes in said casing, means for connecting the open ends of the U-bent tubes of each row for back and forth traverse therethrough, and means for supporting the tubes, said rows of tubes being arranged in interspersed relation with the U-bends of the tubes of adjacent rows at opposite ends of and within the casing.

16. An economizer comprising, in combination, a casing having inlet and outlet for a heating medium, a plurality of rows of U-bent tubes, said tubes being entirely within the casing except for their open end portions which extend to the outside of the casing, means for connecting the open ends of the U-bent tubes of each row for back and forth traverse therethrough, and means for supporting said tubes, said rows of tubes being arranged in interspersed relation with the U-bends of the tubes of adjacent rows at opposite ends of and within the casing.

17. An economizer comprising, in combination, a casing having inlet and outlet for a heating medium and having end tube sheets, a plurality of rows of U-bent tubes in the casing, the open end portions of adjacent rows being supported from and extending through opposite tube sheets, said rows being arranged in interspersed relation and with the loop portions of the tubes located between the tube sheets, and means for connecting the open ends of said tubes for back and forth traverse therethrough.

18. An economizer comprising, in combination, a casing having inlet and outlet for a heating medium and having end tube sheets, a plurality of spaced rows of U-bent tubes supported from one tube sheet adjacent the open ends of the tubes, a plurality of spaced rows of U-bent tubes supported from the other tube sheet adjacent the open ends of the tubes, said last mentioned plurality of spaced rows of tubes occupying the spaces between the first mentioned rows, and means for connecting the open ends of said tubes for back and forth traverse therethrough, and said tubes having their loop portions located within the casing.

19. An economizer comprising, in combination, a casing having inlet and outlet for a heating medium and having end tube sheets, a plurality of spaced rows of U-bent tubes supported from one tube sheet adjacent the open ends of the tubes, a plurality of spaced rows of U-bent tubes supported from the other tube sheet adjacent the open ends of the tubes, said last mentioned plurality of spaced rows of tubes occupying the space between the first mentioned rows, means adjacent the loop portions of the tubes for maintaining the tubes in parallel spacing, and means for connecting the open ends of said tubes for back and forth traverse therethrough.

20. An economizer comprising, in combination, a casing having inlet and outlet for a heating medium and having end tube sheets, a plurality of rows of U-bent tubes in the casing, the open end portions of alternate rows being supported from and extending through opposite tube sheets, said tube sheets comprising a plurality of removable sections for giving access to the tubes of the economizer for cleaning, removal and replacement, and means for connecting the open ends of said tubes for back and forth traverse therethrough.

21. An economizer comprising, in combination, a casing having inlet and outlet for a heating medium and having end tube sheets, a plurality of rows of U-bent tubes in the casing, the open end portions of alternate rows being supported from and extending through the opposite tube sheets, said tube sheets comprising a plurality of removable sections each of which is arranged to give access to a different row of tubes transversely of the economizer for cleaning, removal and replacement of the tubes, and means for connecting the open ends of said tubes for back and forth traverse therethrough.

22. In combination, a flue adapted to carry heated gases, a fluid heater comprising an inlet and an outlet header, and a plurality of rows of tubular members connected at their ends to the respective headers whereby the fluid flows therethrough in parallel, each row extending across the flue in a plurality of passes, the portions of the tubular members of each row which extend across the flue being connected at one end of the heater by integral bends and at the other end of the heater by removable large and small return bend fittings, all of the return bend fittings being located at the same side of the heater with the larger fittings embracing smaller fittings and obliquely related thereto.

ROBERT K. BEHR.